(12) United States Patent  
Stern et al.

(10) Patent No.: US 7,617,422 B2
(45) Date of Patent: Nov. 10, 2009

(54) METHOD, SYSTEM, AND PROGRAM PRODUCT FOR MANAGING DATA DECAY

(75) Inventors: Edith H. Stern, Yorktown Heights, NY (US); David L. Ehnebuske, Holmes, NY (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 11/461,657

(22) Filed: Aug. 1, 2006

(65) Prior Publication Data

US 2008/0126330 A1    May 29, 2008

(51) Int. Cl.
*G06F 11/00* (2006.01)
(52) U.S. Cl. .......................... 714/54; 714/42
(58) Field of Classification Search .................. 714/54, 714/42; 360/31
See application file for complete search history.

(56) References Cited

U.S. PATENT DOCUMENTS

| | | | | |
|---|---|---|---|---|
| 5,500,940 | A * | 3/1996 | Skeie | 714/25 |
| 5,828,583 | A * | 10/1998 | Bush et al. | 702/185 |
| 6,249,838 | B1 * | 6/2001 | Kon | 711/103 |
| 6,570,378 | B2 * | 5/2003 | Goh et al. | 324/212 |
| 6,898,033 | B2 * | 5/2005 | Weinstein et al. | 360/31 |
| 6,968,339 | B1 | 11/2005 | Stephens | |
| 6,968,479 | B2 * | 11/2005 | Wyatt et al. | 714/53 |
| 7,246,268 | B2 * | 7/2007 | Craig et al. | 714/42 |
| 7,370,241 | B2 * | 5/2008 | Nicholson et al. | 714/47 |
| 2002/0060868 | A1 * | 5/2002 | Lenny et al. | 360/31 |
| 2004/0230833 | A1 | 11/2004 | McCallam et al. | |
| 2005/0044454 | A1 * | 2/2005 | Moshayedi | 714/54 |
| 2005/0234877 | A1 | 10/2005 | Yu | |

* cited by examiner

*Primary Examiner*—Robert Beausoliel
*Assistant Examiner*—Philip Guyton
(74) *Attorney, Agent, or Firm*—Hoffman Warnick LLC

(57) ABSTRACT

The present invention provides a method, system, and program product for managing data decay. Specifically, under the present invention, usage information describing how data should be accessed is obtained. Thereafter, resource information describing resources available for accessing the data is obtained. Then, a data decay potential of the data is computed based on the usage information and the resource information. When the data decay potential exceeds a predetermined threshold, an indicator such as a report, an alarm, an error message, or an event and be communicated, and a remediation action such as a format transformation, a software archiving, or an environment archiving can be initiated.

24 Claims, 2 Drawing Sheets

METHOD, SYSTEM, AND PROGRAM PRODUCT FOR MANAGING DATA DECAY

BACKGROUND OF THE INVENTION

1. Field of the Invention

The present invention generally relates to data decay. Specifically, the present invention provides a method, system, and program product for managing data decay.

2. Related Art

Information technology, particularly digital media storage, has provided enterprises and consumers with outstanding capability in recording and accessing information. Unfortunately, a number of technical and economic factors also mean that such data may become inaccessible over time due to changes in IO devices, degradation of the recording medium, changes in accessing software, etc. For example, large size diskettes (8-inch and 5¼-inch) were commonly used by businesses, consumers and enterprises in the 80s. Information saved on these diskettes is becoming inaccessible, because appropriate diskette drives are quite rare and because the media itself has become partially demagnetized. As another example, files created with word processors in the past may be unusable today, despite their residence on easily accessible hard files, because the word processor software is no longer available, and the format is not understood. While software providers often provide some transformation capability, such transformation does not include all past formats. For example, personal computer operating systems commonly offer to check online for further information if it is asked to attempt to open a file whose format they do not understand. These actions are taken only when an attempt is made to access the data. As these examples illustrate, data decay in various forms has become a growing problem.

In view of the foregoing, there exists a need for a solution that solves at least one of the deficiencies in the related art.

SUMMARY OF THE INVENTION

In general, the present invention provides a method, system, and program product for managing data decay. Specifically, under the present invention, usage information describing how data should be accessed and/or rendered is obtained. Thereafter, resource information describing resources available for accessing and/or rendering the data is obtained. Then, a data decay potential of the data is provided (e.g., computed) based on the usage information and the resource information. When the data decay potential exceeds a predetermined threshold, an indicator such as a report, an alarm, an error message, or an event can be communicated, and a remediation action such as a format transformation, a software archiving, or an environment archiving can be initiated.

The usage information can be determined from sources such as a file extension of a file containing the data, content in the data, or a location of previous access of the data, and can be obtained at a time of the data is created, at a time the data is accessed, or on a scheduled basis. Further, the resources typically include hardware and/or software resources for accessing and/or rendering the data. Along these lines, the resource information can be obtained from sources such as a configuration repository, a discovery tool on data center resources, a web service, a directory, a registry, metadata associated with the resources available, or a catalogue of potentially accessible resources.

A first aspect of the present invention provides a method for managing data decay, comprising: obtaining usage information describing how data should be accessed; obtaining resource information describing resources available for accessing the data; and providing a data decay potential of the data based on the usage information and the resource information.

A second aspect of the present invention provides a system for managing data decay, comprising: a usage information system for obtaining usage information describing how data should be accessed; a resource information system for obtaining resource information describing resources available for accessing the data; and a decay potential system providing a data decay potential of the data based on the usage information and the resource information.

A third aspect of the present invention provides a program product stored on a computer readable medium for managing data decay, the computer readable medium comprising program code for causing a computer system to perform the following steps: obtaining usage information describing how data should be accessed; obtaining resource information describing resources available for accessing the data; and providing a data decay potential of the data based on the usage information and the resource information.

A fourth aspect of the present invention provides a method for deploying an application for managing data decay, comprising: providing a computer infrastructure being operable to: obtain usage information describing how data should be accessed; obtain resource information describing resources available for accessing the data; and compute a data decay potential of the data based on the usage information and the resource information.

A fifth aspect of the present invention provides a computer software embodied in a propagated signal for managing data decay, the propagated signal comprising instructions for causing a computer system to perform the following steps: obtaining usage information describing how data should be accessed; obtaining resource information describing resources available for accessing the data; and providing a data decay potential of the data based on the usage information and the resource information.

A sixth aspect of the present invention provides a method for managing data decay, comprising: accessing at least one element of media containing data; logging usage information for the accessing; logging resource information associated with the access; and computing a data decay potential of the data based on at least one of said usage information or the resource information.

A seventh aspect of the present invention provides a method for managing data decay, comprising: determining at least one least one resource suitable for accessing the data; evaluating a likelihood that the at least one resource can successfully access the data; and providing an indication of the evaluating.

Therefore, the present invention provides a method, system, and program product for managing data decay.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides a method, system, and program product for managing data decay. Specifically, under the present invention, usage information describing how data should be accessed and/or rendered is obtained. Thereafter, resource information describing resources available for accessing and/or rendering the data is obtained. Then, a data decay potential of the data is provided (e.g., computed) based on the usage information and the resource information. When the data decay potential exceeds a predetermined threshold, an indicator such as a report, an alarm, an error message, or an event can be communicated, and a remediation action such as a format transformation, a software archiving, or an environment archiving can be initiated.

The usage information can be determined from sources such as a file extension of a file containing the data, content in the data, or a location of previous access of the data, and can be obtained at a time of the data is created, at a time the data is accessed, or on a scheduled basis. Further, the resources typically include hardware and/or software resources for accessing and/or rendering the data. Along these lines, the resource information can be obtained from sources such as a configuration repository, a discovery tool on data center resources, a web service, a directory, a registry, metadata associated with the resources available, or a catalogue of potentially accessible resources.

Figure 1:
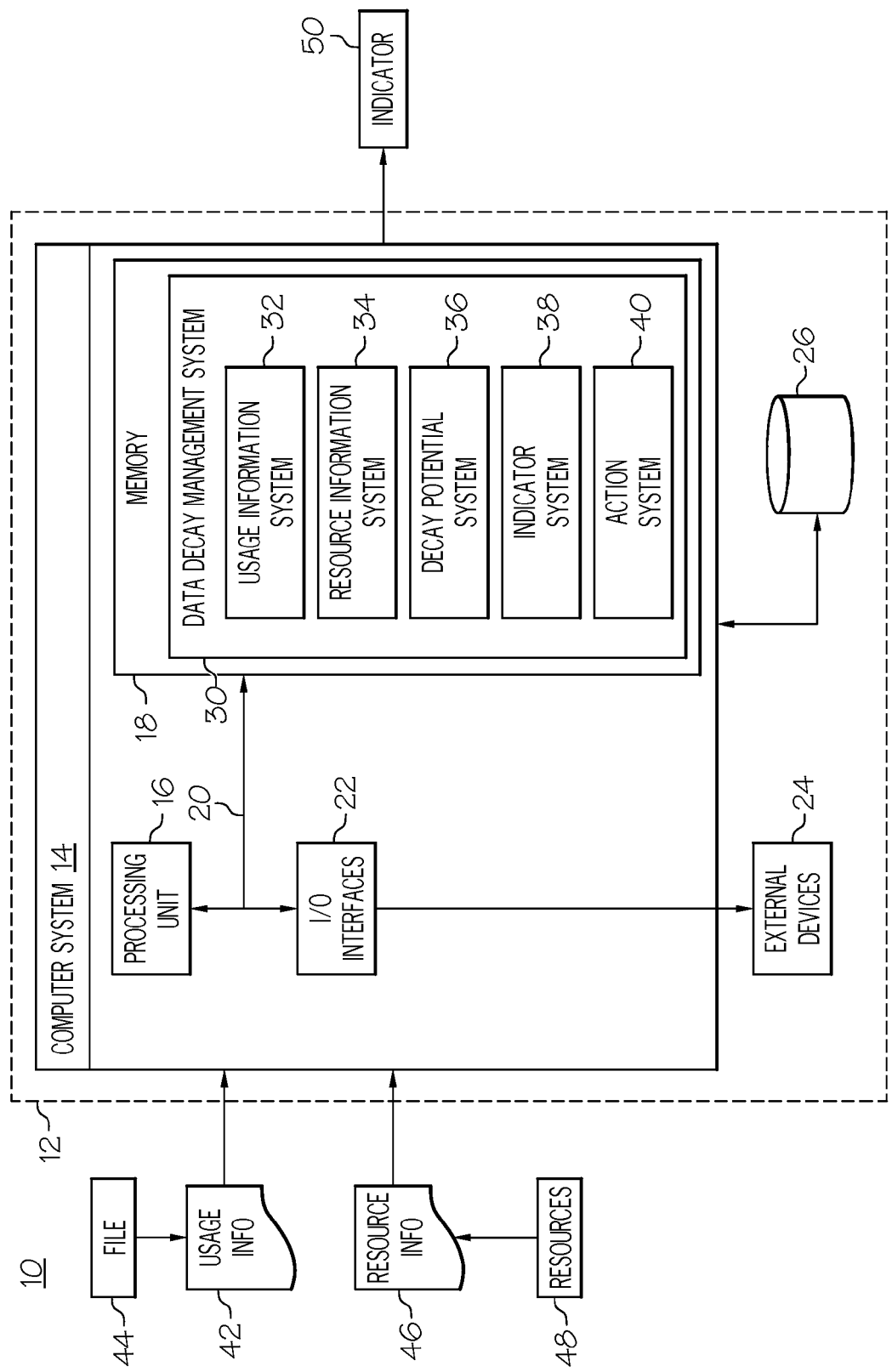
FIG. 1 depicts a system for managing data decay according to the present invention.

Referring now to FIG. 1, a system 10 for managing data decay according to the present intervention is shown. As depicted, system 10 includes a computer system 14 deployed within a computerized infrastructure/environment 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computerized infrastructure 12 is intended to demonstrate that some or all of the components of system 10 could be deployed, managed, serviced, etc. by a service provider who offers to manage data decay according to the present invention.

As shown, computer system 14 includes a processing unit 16, a memory 18, a bus 20, and input/output (I/O) interfaces 22. Further, computer system 14 is shown in communication with external I/O devices/resources 24 and storage system 26. In general, processing unit 16 executes computer program code, such as data decay management system 30, which is stored in memory 18 and/or storage system 26. While executing computer program code, processing unit 16 can read and/or write data to/from memory 18, storage system 26, and/or I/O interfaces 22. Bus 20 provides a communication link between each of the components in computer system 14. External interfaces 24 can comprise any devices (e.g., keyboard, pointing device, display, etc.) that enable a user to interact with computer system 14 and/or any devices (e.g., network card, modem, etc.) that enable computer system 14 to communicate with one or more other providing devices.

Computerized infrastructure 12 is only illustrative of various types of computer infrastructures for implementing the invention. For example, in one embodiment, computer infrastructure 12 comprises two or more providing devices (e.g., a server cluster) that communicate over a network to perform the various process steps of the invention. Moreover, computer system 14 is only representative of various possible computer systems that can include numerous combinations of hardware. To this extent, in other embodiments, computer system 14 can comprise any specific purpose providing article of manufacture comprising hardware and/or computer program code for performing specific functions, any providing article of manufacture that comprises a combination of specific purpose and general purpose hardware/software, or the like. In each case, the program code and hardware can be created using standard programming and engineering techniques, respectively. Moreover, processing unit 16 may comprise a single processing unit, or be distributed across one or more processing units in one or more locations, e.g., on a client and server. Similarly, memory 18 and/or storage system 26 can comprise any combination of various types of data storage and/or transmission media that reside at one or more physical locations. Further, 20 interfaces 22 can comprise any system for exchanging information with one or more external interfaces 24. Still further, it is understood that one or more additional components (e.g., system software, math co-processing unit, etc.) not shown in FIG. 1 can be included in computer system 14. However, if computer system 14 comprises a handheld device or the like, it is understood that one or more external interfaces 24 (e.g., a display) and/or storage system 26 could be contained within computer system 14, not externally as shown.

Storage system 26 can be any type of system (e.g., a database) capable of providing storage for information under the present invention such as use information, resource information, data decay probabilities etc. To this extent, storage system 26 could include one or more storage devices, such as a magnetic disk drive or an optical disk drive. In another embodiment, storage system 26 includes data distributed across, for example, a local area network (LAN), wide area network (WAN) or a storage area network (SAN) (not shown). In addition, although not shown, additional components, such as cache memory, communication systems, system software, etc., may be incorporated into computer system 14.

Shown in memory 18 of computer system 14 is data decay management system 30, which includes a usage information system 32, a resource information system 34, a decay potential system 36, an indicator system 38, and an optional action system 40. It should be understood that representation of data decay management system 30 is intended only to illustrate one possible way of providing the functionality described herein. As such, the functionality described herein could be represented by a different configuration of systems (e.g., the functions provided by the systems of data decay management system 30 could be combined into few systems or further separated into additional systems). In addition, although the functionality of the present invention is described herein as being carried out by a single program (e.g., data decay management system 30), this need not be the case.

In any event, data decay management system 30 will determine a data decay potential of a file 44 or the like. This determination is based upon usage information 42 that describes how file 44 should be accessed and/or rendered, and resource information 46 describing resources 48 available for accessing and/or rendering the data 44. In general, usage information system 32 can obtain/gather the usage information in a variety of ways, and then store/log the same (e.g., in storage system 26). For example, usage information 42 about the software needed to access the data can, in some systems, be determined from a file extension of file 44 containing the data. For example, if the name of file 44 is examined by usage information system 32, and is determined to have an .LWP extension, it is known that Lotus Word Pro should be used to access file 44 (Lotus and Lotus Word Pro are trademarks of International Business Machines Corp. in the United States or other countries). Similarly, usage information system 32 can examine content within file 44 (e.g., images) to determine what type of resources 48 might be needed to access and/or render file 44. For example, if file 44 contained graphics, then software and hardware capable of accessing and/or rendering images is needed. In addition, usage information system 32 can access other sources of information for information describing the use of file 44 such as a previous location in which file 44 was accessed, a type and/or age of the medium on which file 44 is stored, etc. In any event, this information can be obtained by usage information system 32 as meta data, and can be obtained or updated at the time the data is created, at a time the data is accessed, or on a scheduled basis.

It should be understood that file 44 is shown only to illustrate one possible medium containing the data. To this extent, the present invention could be utilized in conjunction with any type of data (e.g., audio, video, etc.) on ay type of media such as cellular telephone (e.g., memory), databases, videotape, DVDs, compact discs, etc.

Regardless, in a similar fashion, resource information system 34 will obtain and store/log resource information 46 that describes the availability of resources 48 for accessing and/or rendering file 44. Resources 48 generally include hardware and/or software, and resource information 46 can be any type of information that describes the resources and their general availability. For example, an entry for compact disk drives in resource information 46 could list the compact disk drives along with the remaining quantity and their respective ages.

Resource information 46 can be obtained from any type of source such as a configuration repository, a discovery tool on data center resources, a web service, a directory, a registry, metadata associated with the resources available, a catalogue of potentially accessible resources 48, etc. In addition, the resource information 46 obtained by resource information system 34 can further describe dependencies between the resources 48. For example, if a particular software program requires another software program or a particular hardware convention to access and/or render file 44 properly, such dependencies can be gathered by resource information system 34. To this extent, resource information system 34 can incorporate or utilize any known tools that foster this type of information collection.

Once the usage information 42 and the resource information 46 have been obtained, decay potential system 36 will provide (e.g., compute) a data decay potential based thereon. The data decay potential indicates a likelihood that the data will fail to be accessed. For example, if the data 44 is stored on a 5¼ diskette, and there is only one 5¼ inch disk drive available, a high data decay potential would result.

A. Illustrative Data Decay Potential Computation

Shown below is an illustration for various methods by which data decay potential can be computed.

Approach 1

One approach to calculating decay potential relies on empirical knowledge of previous failure rates. These may be understood from experience in the data center, or may be supplied by the manufacturer. For example, Let $S_i$ be the expectation that operation $O_i$ in a system will succeed. If $O_x$ relies on two operations $O_y$ and $O_z$ to each work correctly for $O_x$ to succeed, then $S_x=S_y*S_z$ (assuming the two components failure modes are not coupled). If $O_x$ will succeed if either $O_y$ or $O_z$ succeed then $1/S_x=1/S_y*1/S_x$. The result is the expectation that $O_i$ will fail is $F_i=(1-S_i)$. Let:

$M_{i,j}$ be the j-th piece of physical storage medium of type i. (e.g., a diskette)

$t_{i,j}(1), t_{i,j}(2), \ldots t_{i,j}(5)$ be the last 5 times at which the $M_{i,j}$ was successfully accessed.

$s_{i,j}(1), s_{i,j}(2), \ldots s_{i,j}(5)$ be the ratio of soft errors to bytes read during the last 5 successful accesses of $M_{i,j}$.

$S_{i,j}(t, t_{i,j}(1), t_{i,j}(2), \ldots t_{i,j}(5), S_{i,j}(1), S_{i,j}(2), \ldots S_{i,j}(5))$ be the expected ratio, given its history, of soft errors to bytes read that $M_{i,j}$ will have if read at time t.

$H_{i,j}(t, t_{i,j}(1), t_{i,j}(2), \ldots t_{i,j}(5), S_{i,j}(1), s_{i,j}(2), \ldots s_{i,j}(5))$ be the expectation that, given its history, $M_{i,j}$ will have a hard read error if read at time t.

$R_{i,h}$ be the h-th rendering device for medium of type i. A diskette drive, for example.

$u_{i,h}(1), u_{i,h}(2), u_{i,h}(5)$, be the last 5 times at which the $R_{i,h}$ was successfully used to read a piece of medium.

$v_{i,h}(1), v_{i,h}(2), \ldots v_{i,h}(5)$ be the difference between $s_{i,j}(x)$ when $t_{i,j}(x)=u_{i,j}(z)$ and $S_{i,j}(u_{i,j}(z), t_{i,j}(1), t_{i,j}(2), \ldots t_{i,j}(5), S_{i,j}(1), s_{i,j}(2), \ldots s_{i,j}(5))$ for the last 5 successful uses of $R_{i,h}$ (i.e., $V_{i,h}(Z)$ is the fraction of the excess of soft errors actually encountered on $R_{i,h}$ at time $u_{i,h}(Z)$ compared to expectations.)

$F_{i,h}(t, u_{i,h}(1), u_{i,h}(2), \ldots u_{i,h}(5), v_{i,h}(1), v_{i,h}(2), \ldots v_{i,h}(5))$ be the expectation that, given its history, $R_{i,h}$ will have a hard read error on error-free media at time t.

$F_i(t)$ is defined as the expectation that no available rendering device will be able to read an error-free medium of type i. Namely, $1/F_i(t)=1/F_i(1)*1/F_i(2)* \ldots, *1/F_i(h)$ and $E_{i,j}(t)$, the expectation that at time t a $M_{i,j}$ will have decayed to the point that it cannot be read on any available rendering device as:

$$E_{i,j}(t)=F_i(t)*H_{i,j}(t,t_{i,j}(1),t_{i,j}(2),\ldots t_{i,j}(5),S_{i,j}(1), s_{i,j}(2),s_{i,j}(5))$$

In a similar way, we factor in the software expectations.

Approach 2

In another embodiment, data decay potential is calculated as a combination of decay of the medium, rendering devices, and software used in the rendering.

Decay=Decay of the medium+Decay of the rendering devices+Decay of the software

We first define the following functions:

For each piece of physical data medium (e.g., diskette), we define the following:

$A_1(m)$=Age of a piece of physical medium m, divided by the expected lifespan of m. This represents a normalized measure of age of the medium.

$T_1(m)$=Time (e.g., in minutes) since m was last successfully accessed $E_1(m)$=Soft error rate encountered during last access of m $N_1(m)$=Number of data center devices capable of rendering m $D_1(m)=[T_1(m)*E_1(m)]/A_1(m)$ $D_1(m)$ is a measure of the physical media decay potential.

Similarly, for each piece of equipment r of type t, capable of rendering m, we define the following:

$A_2(r)$=Age of the rendering equipment (e.g., tape drive), divided by the expected lifespan of r. This represents a normalized measure of the age of the resource.

$T_2(r)$=Time (e.g., in minutes) since r was last successfully used $E_2(r)$=Soft error rate encountered during last use of r $M(r)$=Number of modifications or repairs of r, divided by the expected number of modifications of a device of its type, the whole multiplied by a constant $C_t$ where $C_t$ is chosen to express a confidence factor in the machine type t. That is, if there is low confidence in t, then the constant selected can be high. This constant has the effect of increasing the influence of multiple repairs on the estimation of decay potential.

$$D_2(r)=[T_2(r)*E_2(r)*M(r)]/A_2(r)$$

$D_2(r)$ is a measure of the device "decay" potential for a device r

For each equipment type t, we define:

$N(t)$=number of devices of type t $R(t)$=Estimated Time (e.g., in minutes) to acquire use of an additional device of type t $$D_3(t)=\min \{D_2(r), \text{ for all } r \text{ of type } t\}/N(t)$$

$D_3(t)$ is a measure of the equipment type t decay potential

For each file f of format x we define:

$A_3(x)$=age of file format x in which f is structured $S(x)$=number of software programs available capable of rendering x $T_3(x)$=Time (e.g., in minutes) since x was last successfully used $D_4(x)=A_3(x)*T_3(x)/S(x)$ For each software program p, capable of rendering x we define:

$T_4(p)$=Time (e.g., in minutes) since p was last successfully used $N_2(p)$=Number of systems on which p may be run $L(p)=T_4(p)/N_2(p)$ where $L(p)$ then represents an initial decay measure of p Dependencies z of a program p can be understood in several ways. First, such information may reside in a Configuration Management Database. Alternately, it can be understood by discovery during program operations, via such programs as IBM Tivoli Application Dependency Discovery (TADDM). We define:

$M(p)$=0 if p has no external dependencies,

=sum $\{L(z)$, for all dependencies z of p$\}$ where $M(p)$ represents a measure of the decay potential of the dependencies of p In one embodiment, we estimate the decay potential of a file f of format x stored on medium m, and rendered on device r of type t via software programs p with dependencies z as follows:

Decay=Decay of the medium+Decay of the rendering devices+Decay of the software:

$$D(f,x,m,r,t,p)=D_1(m)+D_3(t)+D_4(x)+L(p)+M(p)$$

It is to be understood that in a preferred embodiment, these factors will be weighted with multipliers representing confidence factors in each of the elements of the decay. Further, other elements of decay may be measured and added, such as the reliability of communications links between dependent devices/software. Additionally, while we represent decay with components as listed above in this example, it is not necessary to have all components represented in each calculation. For many users it is expected that the contribution of some of these factors will be small and not used in these estimates of decay.

Regardless of approach, once the data decay potential is computed, it can be compared to a predetermined threshold, which if exceeded would cause indicator system 38 to send an indicator 50 (e.g., a report, an alarm, an error message, an event, etc.) to optional action system 40 which can then recommend and/or initiate/implement at least one remedial action (e.g., a format transformation, a software archiving, an environment archiving, generating and/or sending a message/tickler, etc.). Indicators 50 and remedial actions could also be produced should if a data decay potential grows by a certain amount over time.

In another embodiment, action system 40 is not contained within the data decay management system 30, but is represented by the subsystem(s), which consume indicators 50. Indicators 50 may trigger actions that are external to computer system 14 and data decay management system 30. Such systems include but are not limited to a paging system, an SMS system, and an autonomic system that provides data center problem remediation.

Figure 2:
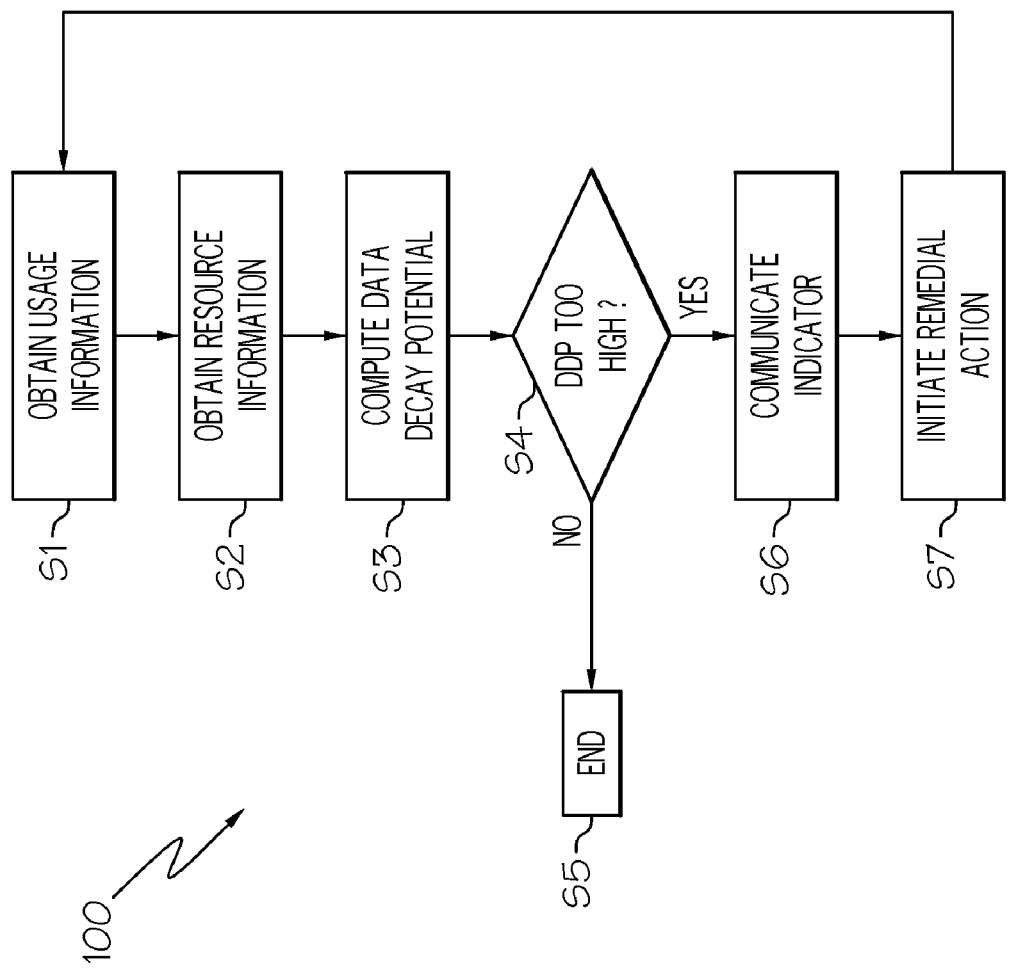
FIG. 2 depicts a method flow diagram according to the present invention.

Referring now to FIG. 2, a method flow diagram 100 according to the present invention is shown. As depicted, usage information describing how the data should be accessed is obtained in step S1. As mentioned, the usage information can be determined from a variety of sources such as a file extension of a file containing the data, content in the data, or a location of previous access of the data. In a typical embodiment, when data is accessed the usage information is updated. The usage information can be provided as meta data, and can be obtained/gathered at a time of the data is created, at a time the data is accessed, or on a scheduled basis. In step S2, resource information describing resources available for accessing and/or rendering the data is obtained. As mentioned above, the resources can be hardware and/or software resources. Along these lines, the resource information can further describe dependencies between the resources. Moreover, the resource information can be obtained/gathered from a configuration repository, a discovery tool on data center resources, a web service, a directory, a registry, metadata associated with the resources available, or a catalogue of potentially accessible resources.

In any event, in step S3, a data decay potential of the data (the contents therein) will be computed based on the usage information and hardware information. In step S4, it is determined whether the data decay potential is too high (e.g., exceeds a predetermined threshold, grows too quickly, etc.). If not, the process can end in step S5. If, however, the data decay potential was determined to be too high in step S4, an indicator (e.g., a report, an alarm, an error message, an event, etc.) can be communicated to responsible parties in step S6. In step S7, appropriate remedial action can optionally be initiated (e.g., a format transformation, a software archiving, an environment archiving, etc.). It should be understood that the order in which some of the above-referenced steps are performed can change. For example resource information could be obtained concurrently or before usage information (and vice versa). Moreover, there could be a situation where remedial action is initiated concurrently or before an indicator is communicated (e.g., where loss of data is imminent).

While shown and described herein as a method and system managing data decay, it is understood that the invention further provides various alternative embodiments. For example, in one embodiment, the invention provides a computer-readable/useable medium that includes computer program code to enable a computer infrastructure to manage data decay. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a providing device, such as memory 18 (FIG. 1) and/or storage system 26 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to manage data decay. In this case, the service provider can create, maintain, support, etc., a computer infrastructure, such as computerized infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for managing data decay. In this case, a computerized infrastructure, such as computerized infrastructure 12 (FIG. 1), can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a providing device, such as computer system 14 (FIG. 1), from a computer-readable medium; (2) adding one or more providing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and mean any expression, in any language, code or notation, of a set of instructions intended to cause a providing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular providing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method for managing data decay, comprising:

obtaining usage information describing how data should be accessed;

obtaining resource information describing resources available for accessing the data;

providing a data decay potential of the data based on the usage information and the resource information, and initiating a remediation action when the data decay potential exceeds the a predetermined threshold, the remediation action being selected from a group consisting of a format transformation, a software archiving, or an environment archiving.

2. The method of claim 1, the usage information being determined from a file extension for a file containing the data, content in the data, or a location of previous access of the data.

3. The method of claim 1, the usage information being provided as meta data.

4. The method of claim 1, the usage information being obtained at at least one of a time the data is created, at a time the data is accessed, or on a scheduled basis.

5. The method of claim 1, the resources comprising hardware and software resources.

6. The method of claim 1, the resource information further describing dependencies between the resources.

7. The method of claim 1, the resource information being obtained from at least one of a configuration repository, a discovery tool on data center resources, a web service, a directory, a registry, metadata associated with the resources available, polling the resource, or a catalogue of potentially accessible resources.

8. The method of claim 1, the data decay potential indicating a likelihood that the data will fail to be accessed.

9. The method of claim 1, further comprising communicating an indicator when the data decay potential exceeds a predetermined threshold, the indicator being at least one of a report, an alarm, an error message, or an event.

10. A system for managing data decay, comprising:

a processor; and a memory, the memory having:

a usage information system for obtaining usage information describing how data should be accessed;

a resource information system for obtaining resource information describing resources available for accessing the data;

a decay potential system providing a data decay potential of the data based on the usage information and the resource information; and an action system for initiating a remediation action when the data decay potential exceeds a predetermined threshold, the remediation action being selected from a group consisting of a format transformation, a software archiving, or an environment archiving.

11. The system of claim 10, the usage information being determined from a file extension of a file containing of the data, content in the data, or a location of previous access of the data.

12. The system of claim 10, the usage information being provided as meta data.

13. The system of claim 10, the usage information being obtained at least one of at a time of the data is created, at a time the data is accessed, or on a scheduled basis.

14. The system of claim 10, the resources comprising hardware and software resources.

15. The system of claim 10, the resource information further describing dependencies between the resources.

16. The system of claim 10, the resource information being obtained from at least one of a configuration repository, a discovery tool on data center resources, a web service, a directory, a registry, metadata associated with the resources available, or a catalogue of potentially accessible resources.

17. The system of claim 10, the data decay potential indicating a likelihood that the data will fail to be accessed.

18. The system of claim 10, further comprising an indicator system for communicating an indicator when the data decay potential exceeds a predetermined threshold, the indicator being a report, an alarm, an error message, or an event.

19. A program product stored on a computer readable storage medium for managing data decay, the computer readable medium comprising program code for causing a computer system to perform the following steps:
  obtaining usage information describing how data should be accessed;
  obtaining resource information describing resources available for accessing the data;
  providing a data decay potential of the data based on the usage information and the resource information; and
  initiating a remediation action when the data decay potential exceeds a predetermined threshold, the remediation action being selected from a group consisting of a format transformation, a software archiving, or an environment archiving.

20. The program product of claim 19, the data decay potential indicating a likelihood that the data will fail to be accessed.

21. The program product of claim 19, the computer readable medium further comprising program code for causing the computer system to perform the following step: communicating an indicator when the data decay potential exceeds a predetermined threshold, the indicator being a report, an alarm, an error message, or an event.

22. A method for deploying an application for managing data decay, comprising:
  providing via a computing device a computer infrastructure which performs the process of:
  obtaining usage information describing how data should be accessed;
  obtaining resource information describing resources available for accessing the data;
  computing a data decay potential of the data based on the usage information and the resource information; and
  initiating a remediation action when the data decay potential exceeds a predetermined threshold, the remediation action being selected from a group consisting of a format transformation, a software archiving, or an environment archiving.

23. The method of claim 22, the data decay potential indicating a likelihood that the data will fail to be accessed.

24. The method of claim 22, the computer infrastructure being further operable to communicate an indicator when the data decay potential exceeds a predetermined threshold, the indicator being a report, an alarm, an error message, or an event.

* * * * *

UNITED STATES PATENT AND TRADEMARK OFFICE
CERTIFICATE OF CORRECTION

| | |
|---|---|
| PATENT NO. | : 7,617,422 B2 |
| APPLICATION NO. | : 11/461657 |
| DATED | : November 10, 2009 |
| INVENTOR(S) | : Stern et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 465 days.

Signed and Sealed this

Nineteenth Day of October, 2010

David J. Kappos
*Director of the United States Patent and Trademark Office*